United States Patent Office 3,505,159
Patented Apr. 7, 1970

3,505,159
PROCESS FOR OBTAINING METAL-PLASTIC COMPOSITE ARTICLES AND ARTICLES OBTAINED THEREBY
Joseph Winter, New Haven, Conn., assignor to Olin Mathieson Chemical Corporation
No Drawing. Continuation of application Ser. No. 696,703, Jan. 10, 1968. This application June 27, 1969, Ser. No. 841,679
Int. Cl. B32b *3/30, 15/08*
U.S. Cl. 161—119                                10 Claims

ABSTRACT OF THE DISCLOSURE

The instant disclosure teaches a process for forming composite metal-plastic articles and the improved article obtained thereby. In particular, the process described in the instant specification relates to the formation of composite metal-polymeric film articles formed by rolling together at a temperature between room temperature and 450° F. at a speed of at least 10 feet per minute in one pass at a reduction of the metal core between 10 and 75% to form a wave-like interface with a plurality of peaks.

---

This application is a continuation of U.S. patent application Ser. No. 696,703, filed Jan. 10, 1968, now abandoned, which is a continuation-in-part of U.S. patent application Ser. No. 565,664, filed May 23, 1966, now U.S. Patent 3,397,045 which in turn is a divisional of U.S. patent application Ser. No. 229,262, filed Oct. 2, 1962, now abandoned.

As stated hereinabove, the present invention relates to composite articles. In particular, the present invention resides in the formation of composite articles having a metal core of aluminum, copper or iron or alloys of any of the foregoing, clad with certain polymeric films, i.e., polyester films as polyethylene terephthalate found commercially under the trademark "Mylar," and polyolefinic films, as polyethylene and polypropylene and copolymers of ethylene and propylene.

Composite articles having a dissimilar core and cladding are highly desirable commercially due to the fact the behavior characteristics of the core and cladding materials may be obtained in one composite article. This is particularly true when one is dealing with composites formed of metal and plastic materials. For example, some uses to which this type of material may be put include printed circuits, self-insulated windings for generators and motors and corrosion inhibition where the polymeric film acts as a barrier layer for corrosion resistance.

However, numerous difficulties have been encountered in the art in the formation of composites of this type. For example, it has been found to be difficult to obtain metal-plastic composites wherein the materials are well bonded with retention of the desirable physical characteristics of the plastic coating.

In addition, it is highly desirable to form metal—polymeric film composites without the use of bonding aids, such as an adhesive material. For example, composites of this type are useful in the preparation of printed circuits. When a bonding aid is utilized, the bonding aid material can effect the mechanism by which the metal is dissolved in the manufacture of the printed circuit. In addition, where a bonding aid is utilized the bond strengths are generally low and readily thermally degradable and the bonding processes are normally expensive.

Accordingly, it is an object of the present invention to provide a process for obtaining metal-polymeric film articles and the improved article obtained thereby.

It is a further object of the present invention to provide a process and article as aforesaid without the use of an adhesive bonding aid and by a simple, convenient and commercially economical procedure.

Further objects and advantages of the present invention will appear from the ensuing discussion.

In accordance with the present invention it has been found that the foregoing objects and advantages are readily obtained and an improved composite article achieved. The process of the present invention comrpises: (A) providing a metal core selected from the group consisting of aluminum, copper, and iron in plate form in a thickness less than 0.250", said metal having a coating thereon in chemical combination with said metal, such as an oxide coating, said coating having a thickness of at least 20 Angstroms and preferably at least 1000 Angstroms; (B) providing a polymeric film cladding selected from the group consisting of polyester films and polyolefinic films, preferably a polyethylene terephthalate film, said film having a thickness less than 0.050"; (C) rolling together said core and cladding at a temperature between room temperature and 450° F. at a speed of at least 10 ft. per minute in one pass at a reduction of the metal core between 10 and 75%; and (D) annealing the resulting composite for at least one minute at a temperature of from 150° F. to 450° F.

The improved article of the present invention obtained in accordance with the foregoing process is characterized as follows. An integral composite article having a metal core as defined hereinabove of a thickness less than 0.225" is clad with a polymeric film as defined above, especially polyethylene terephthalate, said film having a thickness less than 0.050" with the interface between core and cladding characterized by:

(1) A transition layer between the core and cladding in chemical combination with said core and cladding, said transition layer having a thickness of at least 10 Angstroms; and (2) a wave-like interface with a plurality of peaks, said peaks being irregular in distribution and having a greater length than height.

The process of the present invention utilizes a metal core selected from the group consisting of aluminum, copper and iron. Naturally, the terms aluminum, copper and iron are intended to encompass the base alloys of these materials. The cladding materials which may be employed are the polyester films and polyolefinic films, such as polyethylene terephthalate, polyethylene, polypropylene, etc. The preferred core is copper and the preferred cladding is polyethylene terephthalate.

In the process of the present invention the cladding and core are provided in the following form. The core material should be provided in plate form having a thickness less than 0.250", and preferably less than 0.100", i.e., the core may be provided in strip, sheet or the like form. The cladding is provided in a thickness less than 0.050" and preferably in a thickness less than 0.020". The core is preferably the thicker component of the composite.

The core material is treated prior to bonding to provide a coating thereon in chemical combination with the metal core. For example, the surface of the metal core may be modified by providing an oxide coating, a fluoride coating or a sulfate coating. This may be accomplished by a pretreatment, e.g., anodizing, and results in the final composite in a transition region between the metal and film. Thus a molecular, cross-linkage type bond is provided between the core and cladding.

It is preferred, but not required, in accordance with the present invention to lightly mechanically roughen the bonding surface of the core material in order to provide good surface contact at the bite of the rolls. For example, the bonding surface of the core material may be wire brushed or abraded, etc.

The core and cladding must be clean. Cleanliness may be insured by conventional cleaning treatments.

The process of the present invention is characterized by rolling together the core and cladding at a speed of at least 10 ft. per minute, and preferably for commercial reasons at a high speed of at least 100 ft. per minute. The materials are rolled together in one pass at a reduction of the core between 10 and 75% and preferably between 30 and 50%. The cladding is reduced in thickness to a different degree than the core, with this depending on many variables, such as the nature of cladding and metal and the processing variables.

The rolling together is at a temperature between room temperature and 450° F. The high temperatures are preferably achieved by preliminary heating the metal component; alternatively, the rolls may be heated.

It is preferred although not required that the core and cladding come together for the first time in the bite of the rolls, i.e., it is preferred to provide an angle between the cladding and core on entering the rolls. Preferably, an angle in excess of 5° is utilized in order to insure that the cladding and core will not come together earlier than the bite of the rolls. Generally, the included angle between core and cladding is between 5° and 22°.

The core may be clad on one or both sides, as desired.

After the materials are rolled together in the foregoing manner, a firmly bonded core and cladding is obtained. It has been found to be necessary to provide a subsequent anneal in order to obtain a smoother coating and to improve the bond between the core and cladding. This anneal should be for at least one minute at a temperature of from 150° F. to 450° F. The exact time and temperature of the annealing step is dependent on the particular composite and its use. For example, in printed circuitry where additional elongation is desirable, a partial anneal at, for example, 250° F. for up to 48 hours, can be introduced.

If desired, either before or after annealing, the composite may be cold rolled, stretched, leveled or formed.

The resultant composite is highly advantageous and readily overcomes the aforementioned art disadvantages. Thus, adhesive bonding processes normally attain bond peel strengths of from 2 ot 5 lbs. per inch of width; whereas, the present process normally attains a minimum peel strength of 6 lbs. per inch of width.

The present invention and improvements resulting therefrom will be more readily apparent from a consideration of the following illustrative examples.

EXAMPLE I

A strip of clean aluminum alloy 1100 was surface ground on a belt sander in preparation for bonding. One specimen of the surface ground aluminum was heated to a temperature of 650° F. and a second specimen was heated to a temperature of 165° F. Corresponding specimens of Mylar-D film (polyethylene terephthalate) having a thickness of 0.005 inch were placed on each of the heated aluminum specimens and immediately placed in the bite of a rolling mill to provide an approximate 30% reduction in the thickness of the assembly. The rolling speed employed was about 100 feet per minute.

After rolling, the specimen formed with the aluminum substrate heated to 165° F. was examined and it was found that only very localized bonding occurred, transverse cracking was highly evident in the Mylar film in the region where bonding was observed to occur. This observation was evidence of the fact that the tensile strength of the Mylar was not sufficiently high to resist the tensile forces imparted to the Mylar film by the rolling. The sample heated to 650° F. caused a charring of the Mylar film applied thereto and a localized melting. This charring and melting prevented the uniform deposit of a continuous film on the aluminum substrate.

EXAMPLE II

The procedure described in Example I was repeated using tough pitch copper as a substrate and employing the other experimental conditions described therein.

Substantially the same results observed in Example I were also observed for the tough pitch copper.

EXAMPLE III

A specimen of aluminum alloy 1100 was cleaned chemically and anodized electrolytically for one hour to provide an anodized surface oxide layer of approximately 0.008 inch in thickness. The oxide layer thus formed was not sealed as by boiling in water for half an hour. Six samples of the anodized aluminum thus formed were heated in pairs to temperatures respectively of 200° F., 300° F. and 400° F. Dimensionally corresponding specimens of Mylar having a thickness of 0.005 inch were quickly assembled and rolled with each of the six specimens of anodized aluminum. In these operations two rolling speeds were employed for each pair of heated aluminum substrates. Thus, one pair of aluminum substrate sheets was rolled with the Mylar immediately after removal from the heating furnace at a rolling speed of 25 feet per minute and the other was rolled immediately after removal from the furnace at 100 feet per minute. The two other pairs of heated aluminum substrate were similarly rolled at these two rolling speeds. The rolling reduction was set to be approximately 30% for each of the six assemblies.

All specimens were well bonded and had a high bond strength. It was found that the best bonded specimens were produced at the 25 feet per minute rolling speed. Also at the 300° F. temperature and lower speed a much more smooth and uniform distribution of Mylar was produced than in the specimen heated to 400° F. and rolled at the lower speed. More severe transverse cracking was produced in the specimen heated to 400° F.

Samples taken from the specimens heated to 300° F. and 400° F. and rolled at 25 feet per minute were annealed at 375° F. for 10 minutes. This caused the Mylar coating to become smooth and glass like.

Microscopic examination of the composite showed the presence of the aforementioned transition layer and wavelike interface.

The rollability of Mylar was demonstrated by reducing a strip of 0.750 inch thick to about 0.500 by a reduction of about 33%. The rolled sheet was made significantly more transparent by the rolling.

EXAMPLE IV

The procedure described in Example III was repeated using tough pitch copper as a substrate and employing substantially the other experimental conditions described therein. Substantially the same results were obtained.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for obtaining a high strength, composite material which comprises:
   (a) providing a metal core selected from the group consisting of aluminum, copper and iron in plate form in a thickness less than 0.250", said metal having an inorganic coating thereon selected from the group consisting of an oxide, a fluoride, and a sulfate in chemical combination therewith, said coating having a thickness of at least 20 Angstroms;
   (b) providing a polymeric film cladding selected from the group consisting of polyester films and polyolefinic films, said film having a thickness less than 0.050";

(c) rolling together said core and cladding at a temperature between room temperature and 450° F. at a speed of at least 10 feet per minute in one pass at a reduction of the metal core between 10 and 75% to form a wave-like interface with a plurality of peaks, said peaks being irregular in distribution and having a greater length than height; and (d) annealing the resulting composite for at least one minute at a temperature of from 150° F. to 450° F.

2. A process according to claim 1 wherein said film is polyethylene terephthalate.

3. A process according to claim 1 wherein said metal is copper.

4. A process according to claim 1 wherein said metal is aluminum.

5. A process according to claim 1 wherein said coating has a thickness of at least 1000 Angstroms.

6. A process according to claim 1 wherein said coating is an oxide coating formed by anodically oxidizing said metal.

7. A process according to claim 1 wherein said core and cladding come together for the first time in the bite of the rolls.

8. A high strength composite article having a metal core having a thickness less than 0.225" selected from the group consisting of aluminum, copper and iron having an inorganic coating thereon selected from the group consisting of an oxide, a fluoride, and a sulfate, clad with a polymeric film having a thickness less than 0.050" selected from the group consisting of polyester films and polyolefinic films, with the interface between said core and cladding characterized by:

(a) a transition layer between the core and cladding in chemical combination with said core and cladding, said transition layer having a thickness of at least 10 Angstroms; and (b) a wave-like interface with a plurality of peaks, said peaks being irregular in distribution and having a greater length than height, said wave-like interface being generated by rolling together said core and cladding at a temperature between room temperature and 450° F. at a speed of at least 10 feet per minute in one pass at a reduction of the metal core between 10 and 75%.

9. An article according to claim 8 wherein said transition layer is an oxide.

10. An article according to claim 8 wherein said metal core is copper.

References Cited

UNITED STATES PATENTS

| | | | |
|---|---|---|---|
| 2,551,591 | 5/1951 | Foord | 161—225 |
| 2,745,898 | 5/1956 | Hurd | 204—38 X |
| 2,964,436 | 12/1960 | Mikulis et al. | 156—3 |
| 3,240,662 | 3/1966 | Smyers et al. | 161—225 |
| 3,318,758 | 5/1967 | Tell | 161—216 |
| 3,335,050 | 8/1967 | Makowski et al. | 156—308 X |

JOHN T. GOOLKASIAN, Primary Examiner

R. A. KILLWORTH, Assistant Examiner

U.S. Cl. X.R.

29—472.3, 497.5; 161—121, 165, 214, 216, 225; 156—229, 324